United States Patent [19]

Wakabayashi

[11] 4,211,920
[45] Jul. 8, 1980

[54] FAULT LOCATION SYSTEM FOR OPTICAL REPEATING PATHS

[75] Inventor: Hiroharu Wakabayashi, Nakamura, Japan

[73] Assignee: Kokusai Denshin Denwa Kabushiki Kaisha, Japan

[21] Appl. No.: 710

[22] Filed: Jan. 3, 1979

[30] Foreign Application Priority Data

Jan. 9, 1978 [JP] Japan .................. 53-523

[51] Int. Cl.² .................. H04B 9/00; H04B 3/46
[52] U.S. Cl. .................. 455/601; 179/170 F; 179/175.3 R; 179/175.3 F; 324/52; 350/96.16; 455/612
[58] Field of Search .................. 250/199; 179/175.3 F, 179/175.31 R, 170 F; 324/52; 350/96.16

[56] References Cited

U.S. PATENT DOCUMENTS

| | | | |
|---|---|---|---|
| 2,250,950 | 7/1941 | Goldsmith | 179/170 F |
| 3,312,791 | 4/1967 | Markl | 179/175.3 F |
| 3,739,098 | 6/1973 | Camiciottoli | 179/175.31 R |
| 4,074,127 | 2/1978 | Mochida | 250/199 |
| 4,161,635 | 7/1979 | Wolaver | 179/175.31 R |

Primary Examiner—Howard W. Britton
Attorney, Agent, or Firm—Robert E. Burns; Emmanuel J. Lobato; Bruce L. Adams

[57] ABSTRACT

An optical repeating path fault location system for a PCM optical transmission system which is composed of a backward transmission path and a forward transmission path respectively formed of separated optical fibers and having disposed therein a plurality of PCM optical regenerative repeaters at the same repeating positions for the transmission paths. For each of the transmission paths at each repeater position, there are provided a detector for extracting from each one of the transmission paths at least one of frequency signal components individually assigned to the repeaters to provide a detected output, and pulse generating means responsive to the detected output to generate a predetermined common test pattern pulse train for applying as an optical signal to the input portion of the corresponding repeater in each the other of the transmission paths. Repeater identify signals including the frequency signal components respectively assigned to the sequentially disposed PCM regenerative repeaters of each one of the transmission paths are sequentially transmitted from a signal transmitting station of each one of the transmission paths. Each the other of the transmission paths is monitored for a fault on the basis of the reception result of the test pattern pulse train received by the signal transmitting station via each the other of the transmission paths.

3 Claims, 5 Drawing Figures

FAULT LOCATION SYSTEM FOR OPTICAL REPEATING PATHS

This invention relates to a fault location system for a PCM optical transmission system which is composed of backward and forward transmission paths, each formed of an optical fibers and having disposed therein a plurality of PCM optical regenerative repeaters at the same repeater positions as those in the other transmission path.

A transmission path fault location or supervisory system, which supervises the transmission path characteristic and, upon occurrence of a fault, locates and rapidly repairs the fault, is indispensable for practical application of the transmission system. In recent years, an optical transmission system employing glass fibers as transmission media has been intensively studied and developed and will be put to practical use in the near future, and also in such an optical transmission system, the supervisory system is important for its practical application.

In such an optical transmission system, a multistage repeater FDM (frequency-division multiplex) transmission system is not suitable because of poor linearity of a light emitting device and a photo detector, and a PCM transmission system is mainly used. Therefore, in a submarine cable system using optical fibers, no use can be made of such analog methods as an SV signal monitoring method and a distortion turnback method (refer to, for example, "KDD Technical Journal", No. 86, 1975, published by the applicant company) which have heretofore been employed as the fault location system therefor. As fault location systems for PCM transmission paths, there have been proposed a pulse trio method (refer to "Reports on Studies and Practical Applications", vol. 14, No. 1, Nippon Telegraph and Telephone Public Corporation, Electrical Communication Laboratory), the phase detection method (refer to "Reports on Studies and Practical Applications", Vol. 25, No. 1, Nippon Telegraph and Telephone Public Corporation, Electrical Communication Laboratory) and the bipolar error check method (refer to Institute of Electronics and Communication Engineers of Japan, Society for the Study of Communication Systems, Data CS-72-156) which have heretofore been used in land systems. However, any of those methods employs an interstitial copper pair for the transmission of a repeater identify signal or a turnback signal from the repeater. In the submarine cable system employing optical fibers, the use of the interstitial copper pair is uneconomical for the following reasons:

(1) Since the submarine cable is laid over a long distance, repeating amplifiers for the signal passing through the interstitial copper pair is needed, resulting in a complicated system composition.

(2) The reliability of the interstitial copper pair transmission line must be designed at a high level, which leads to an uneconomical system design.

(3) The use of the interstitial copper pair introduces complexity in the cable construction.

Accordingly, a fault location system using a main transmission path instead of the interstitial copper pair is very effective for simplification and economization of the transmission system. In the submarine cable system using optical fibers, it can be considered to employ such a construction that a plurality of pairs of fibers for backward and forward transmission paths are housed in one cable and that regeneration is effected for the individual transmission paths by PCM regenerative repeaters installed in the same housing. With such an arrangement, it is possible to provide an additional circuit in each repeater and couple the repeaters of the backward and forward transmission paths with each other through the additional circuit. A supervisory system of this kind that has heretofore been proposed is a system, in which a signal of the backward transmission path is directly turned back to the forward transmission path via a switch in an electrical circuit of an optical repeater (Japanese Patent Disclosure No. 99904/76). However, this method has the following defects:

(1) Since a signal including repeater identify information is directly turned back, limitations are imposed on a repeated path test pattern.

(2) Since the repeater identify information differs from for repeaters, pulse patterns for the transmission path testing vary with the repeaters which turn back the abovesaid signals, and the transmission paths cannot be tested under the same conditions. Further, the error rate of each repeater is obtained by the differential method but low in accuracy due to the above defect.

(3) Code errors occurring in the backward and forward paths cannot be separated from each other.

(4) Since the signal is turned back at the electrical circuit portion of the repeater, a switch is needed in the main transmission system, resulting in markedly lowered reliability of the main transmission system.

An object of this invention is to provide a fault location system for a cable system using optical fibers which enables a station to accurately measure an error of each of regenerative repeaters inserted in the transmission path and locate a fault on the basis of the receiving result of a test pattern pulse transmitted from a simple device installed in each repeater.

In accordance with this invention, there is provided an optical repeating path fault location system for a PCM optical transmission system which is composed of a backward transmission path and a forward transmission path respectively formed of separated optical fibers and having disposed therein a plurality of PCM optical regenerative repeaters at the same repeating positions for the backward transmission path and the forward transmission path, wherein there are provided for each of the backward transmission path and the forward transmission path at each repeater position a detector for extracting from each one of the backward transmission path and the forward transmission path at least one of frequency signal components individually assigned to the repeaters to provide a detected output, and pulse generating means responsive to the detected output to generate a predetermined common test pattern pulse train for applying as an optical signal to the input portion of the corresponding repeater in each the other of the backward transmission path and the forward transmission path, wherein repeater identify signals including the frequency signal components respectively assigned to the sequentially disposed PCM optical regenerative repeaters of each one of the backward transmission path and the forward transmission path are sequentially transmitted from a signal transmitting station of each one of the backward transmission path and the forward transmission path, and wherein each the other of the backward transmission path and the forward transmission path is monitored for a fault on the basis of the reception result of the test pattern pulse train received by the signal transmitting station via each the other of the backward transmission path and the forward transmission path.

This invention will be described with reference to the accompanying drawings, in which.

Figure 1:
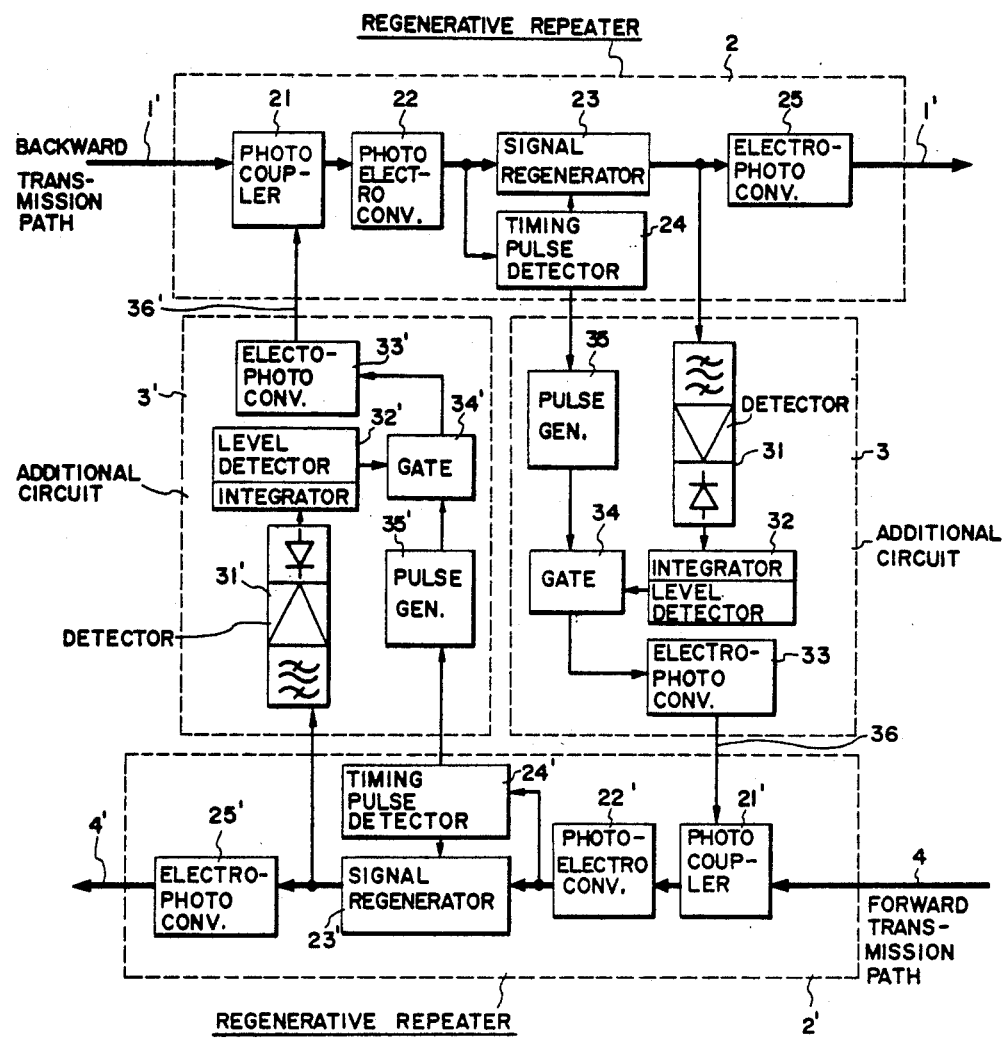
FIGS. 1 and 4 are block diagrams each illustrating an embodiment of this invention.

With reference to FIG. 1, an example of the construction of a repeater for use in this invention will be described. Reference numerals 1 and 1' indicate, for example, backward transmission paths formed of optical fibers; 4 and 4' designate, for instance, forward transmission paths formed of optical fibers; 2 and 2' identify regenerative repeaters respectively inserted in the backward and forward transmission paths; 3 and 3' denote additional circuits respectively associated with the regenerative repeaters 2 and 2' for fault location. In the regenerative repeaters 2 and 2', reference numerals 21 and 21' represent photo couplers; 22 and 22' show photo-electro converters; 23 and 23' refer to signal regenerators; 24 and 24' indicate timing pulse detectors; and 25 and 25' designate electro-photo converters. In the additional circuits 3 and 3', reference numerals 31 and 31' identify detectors for extracting and detecting a particular frequency component ($f_o$) included in a pulse train; 32 and 32' denote an integrator-level detector for preventing malfunction during ordinary serves; 33 and 33' identify electro-photo converters; 34 and 34' represent gate circuits; 35 and 35' show pulse generators which are respectively actuated by timing signals from timing pulse detectors 24 and 24'; and 36 and 36' refer to optical fibers for supplying optical signals to the photo couplers 21 and 21', respectively.

Figure 2A:
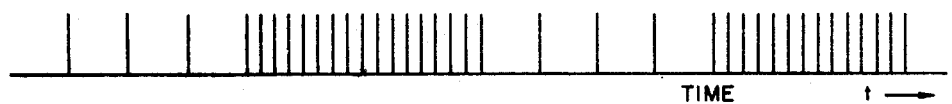
FIGS. 2a and 2b are a time chart showing an example of a repeater identify signal sent out of a landing station.
Figure 2B:
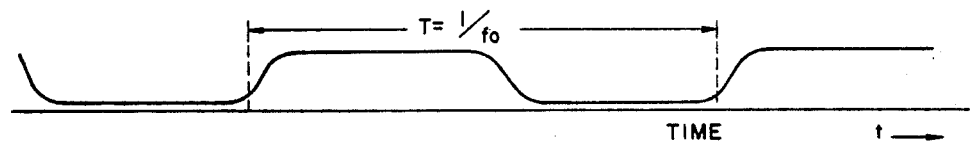

During operation, a repeater identify signal such as shown in FIG. 2A which includes synchronizing timing pulses is transmitted as an optical pulse train over the forward transmission path 1. The optical pulse train includes, for example, the strong particular frequency components $f_o$, as shown in FIG. 2B. In the regenerative repeater 2, the optical pulse train passes through the photo coupler 21 and is applied to the photo-electro converter 22 for conversion to an electric signal, which is then applied to the timing pulse detector 24 for detecting the synchronizing timing pulses. Then, after decision and signal reproduction in the signal regenerator 23, its output is converted by the electro-photo converter 25 into an optical signal, which is provided at the transmission path 1'. At the output of the signal regenerator 23, the pulse train is branched to the additional circuit 3. In the additional circuit 3, the particular frequency component ($f_o$) included in the pulse train is extracted and detected by the detector 31 and, after being rectified into a DC signal, it is applied to the integrator-level detector 32, which, when the DC signal exceeds a predetermined level, opens the gate circuit 34, while the synchronizing timing pulses extracted by the timing pulse detector 24 are applied to the pulse generator 35. The pulse generator 35 generates a predetermined test pattern pulse train by using the synchronizing timing pulses and applies them to the gate circuit 34. The test pattern pulse train having passed through the gate circuit 34 is converted by the electro-photo converter 33 to an optical signal, which is applied via the optical fiber 36 to the photo coupler 21' of the regenerative repeater 2' of the forward transmission path. This optical signal is subjected to phot-electro conversion, signal regeneration and electro-photo conversion by the regenerative repeater 2' and then transmitted over the forward transmission path 4' to a landing station. In the landing station, the code error rate in the forward transmission path from the repeater to the landing station can be measured by using a reference pulse train of the same pattern as the abovesaid test pattern pulse train. In this case, the forward transmission path must be held idle.

The code error rate of the backward transmission path can also be measured by the employment of the additional circuit 3' as is the case with the forward transmission path.

Figure 3:
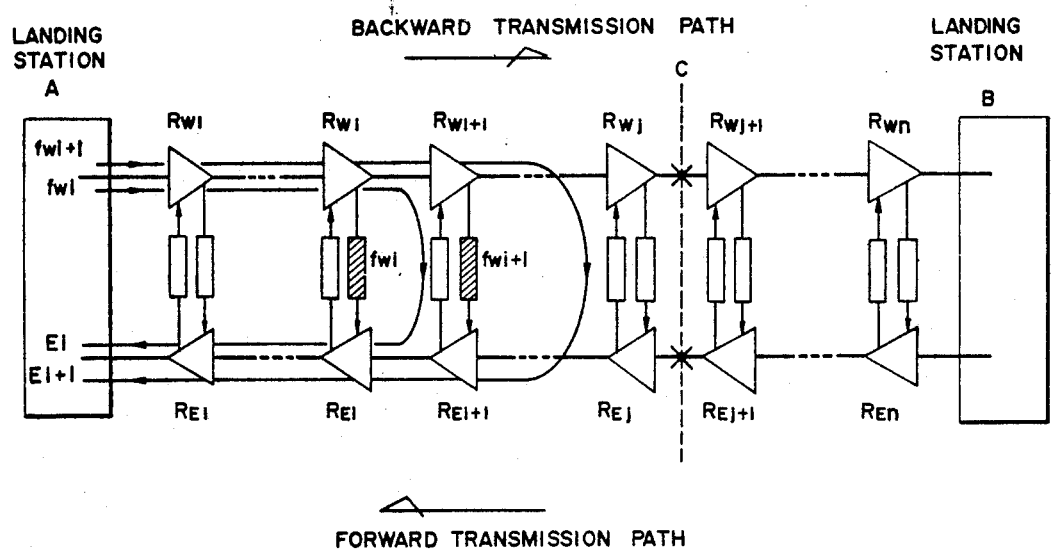
FIG. 3 is a system diagram showing the construction of a repeater system embodying this invention.

FIG. 3 shows the construction of the repeater system employing such a supervisory system as described above. Reference characters $R_{w1}$ through $R_{wn}$ indicate regenerative repeaters inserted in the backward transmission path, and $R_{E1}$ through $R_{En}$ designate regenerative repeaters inserted in the forward transmission path. In the regenerative repeaters $R_{w1}$ through $R_{wn}$ and $R_{E1}$ through $R_{En}$, the center frequencies $f_{w1}$ through $f_{wn}$ and $f_{E1}$ through $f_{En}$ of the detectors 31 and 31' of the additional circuits 3 and 3' are different from one another. If, now, a repeater identify signal including synchronizing pulses and heavy frequency components $f_{wi}(1<i<n)$ as mentioned previously is sent out as an optical pulse train on the backward transmission path, test pattern pulse trains yielded in the regenerative repeaters $R_{wi}$ and $R_{Ei}$ by such operations as described above in respect of FIG. 1 are received in the forward transmission path. Let the error rate in this case be represented by $E_i$. Next, when a repeater identify signal including the heavy frequency components $f_{wi+1}$ is delivered out, a test pattern pulse train controlled by the regenerative repeater $R_{wi+1}$, generated by the regenerative repeater $R_{Ei+1}$ and sent back is received. Let the error rate in this case be represented by $E_{i+1}$. The regenerative repeaters which generate the test pattern pulse trains ($R_{wi}$ and $R_{Ei}$, and $R_{wi+1}$ and $R_{Ei+1}$) provide a sufficient S/N ratio for the optical signals of the test pattern pulse trains being sent out, and in normal operation, code errors by the regenerative repeaters are negligible. Consequently, the difference ($E_{i+1}-E_i$) is the code error rate in the regenerative repeater $R_{Ei}$ in the case of malfunction.

In FIG. 3, when a fault occurs at a point C to make the optical signal transmission impossible, no test pattern pulse trains are sent back from the regenerative repeater $R_{wi+1}$ and the subsequent ones; therefore the fault can be located.

As has been described in the foregoing, this invention enables precise measurement of the code error rate of a repeater in an optical fiber transmission path and accurate location of a fault in the transmission path on the repeater by the provision of simple additional devices. The present invention has the following advantages:

(1) With the use of the pulse pattern generator, no restrictions are imposed on the pattern for the error rate measurement by the repeater identify signal, ensuring to provide an optimum pattern. Further, all the repeaters can be tested with the same pattern. (2) The repeater identify signal is not directly turned back, but instead a new pattern is generated, so that code errors in the forward and backward paths can be separated from each other. (3) Since the test pattern pulse train is coupled as an optical signal with a main transmission path by so-called non-contact connection for each repeater, the reliability of the main transmission path is not degraded.

(4) Since the test pattern pulse train is inserted as an optical signal at the regenerative repeater input portion, the operating level of the electro-photo conversion element of the additional circuit can be set low, which provides for enhanced reliability of the conversion element.

Figure 4:
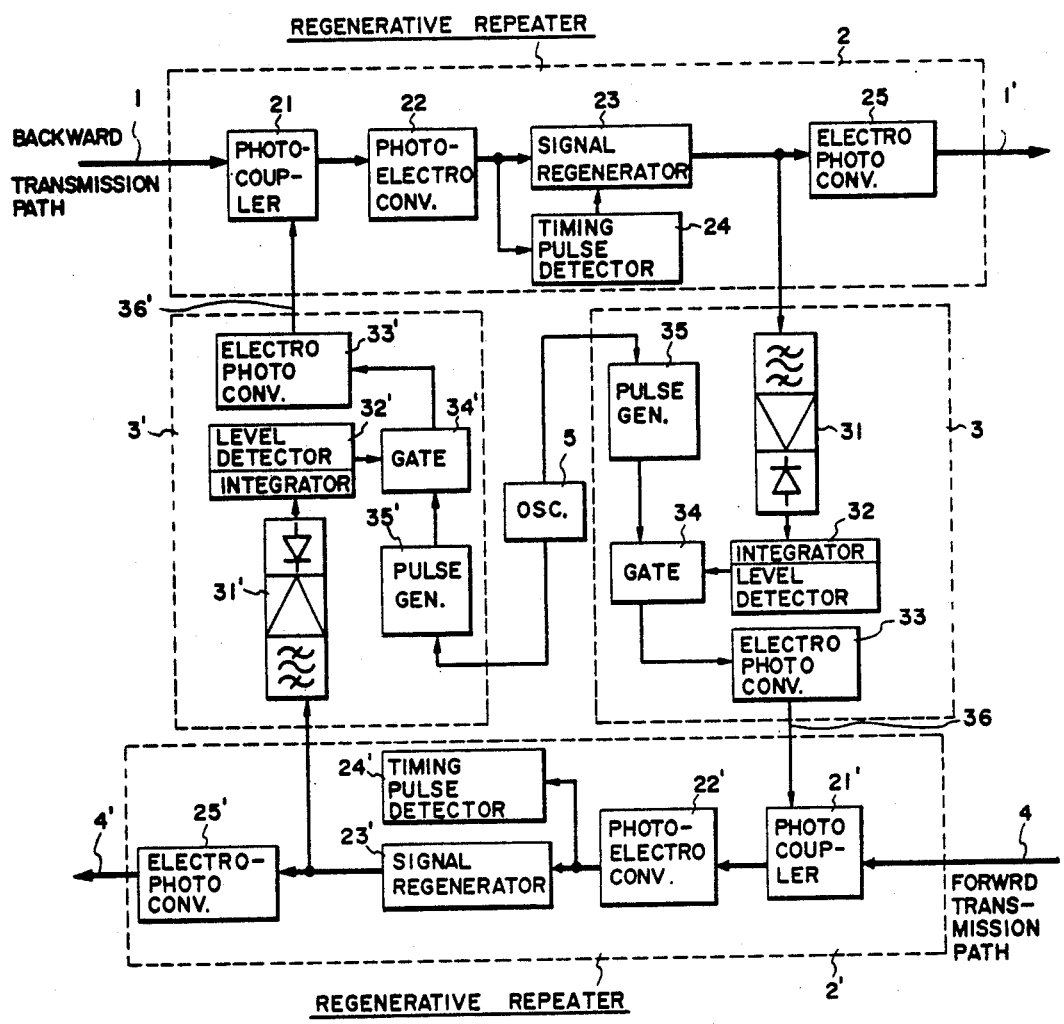

In FIG. 1, drive clock pulses for the pulse pattern generators 35 and 35' are respectively obtained from the timing pulse detectors 24 and 24', but the lock pulses may also be provided from an independent oscillator 5 which generates a frequency matching with the transmission frequency of the main path, as shown in FIG. 4. In this instance, each regenerative repeater 2 or 2' does not require any particular synchronizing circuit and consequently can be simplified in circuit construction. Moreover, the landing station performs detection in synchronism with the timing of the test pattern pulse train transmitted when required.

Thus, all the defects of the conventional supervisory system can be overcome by this invention. Although this invention has been described in connection with the PCM submarine cable system employing optical fibers, it is possible, of course, to apply the invention to a PCM land transmission path using optical fibers. In the foregoing embodiments of the invention, repeaters are each identified by a single particular frequency assigned thereto, but a combination of a plurality of particular frequencies can also be assigned, and this invention is not limited specifically to the identify method described in the embodiments.

What is claimed is:

1. An optical repeating path fault location system for a PCM optical transmission system which is composed of a backward transmission path and a forward transmission path respectively formed of separated optical fibers and having disposed therein a plurality of PCM optical regenerative repeaters at the same repeating positions for the backward transmission path and the forward transmission path, wherein there are provided for each of the backward transmission path and the forward transmission path at each repeater position a detector for extracting from each one of the backward transmission path and the forward transmission path at least one of frequency signal components individually assigned to the repeaters to provide a detected output, and pulse generating means responsive to the detected output to generate a predetermined common test pattern pulse train for applying as an optical signal to the input portion of the corresponding repeater in each of the other of the backward transmission path and the forward transmission path, wherein repeater identify signals including the frequency signal components respectively assigned to the sequentially disposed PCM optical regenerative repeaters of each one of the backward transmission path and the forward transmission path are sequentially transmitted from a signal transmitting station of each one of the backward transmission path and the forward transmission path is monitored for a fault on the basis of the reception result of the test pattern pulse train received by the signal transmitting station via each of the other of the backward transmission path and the forward transmission path.

2. An optical repeating path fault location system according to claim 1, wherein the pulse generating means in a plurality of said PCM regenerative repeaters are each arranged to generate the test pattern pulse train independently of and in synchronism with the other pulse generating means.

3. An optical repeating path fault location system according to claim 1, wherein the repeater identify signals each include common synchronizing pulses, and wherein the pulse generating means in each of a plurality of said PCM optical regenerative repeaters is arranged to generate the test pattern pulse train in synchronism with the synchronizing pulses transmitted.

* * * * *